March 27, 1945.    L. E. PETERS    2,372,447
AIRPLANE WING
Filed Nov. 15, 1943    2 Sheets-Sheet 1
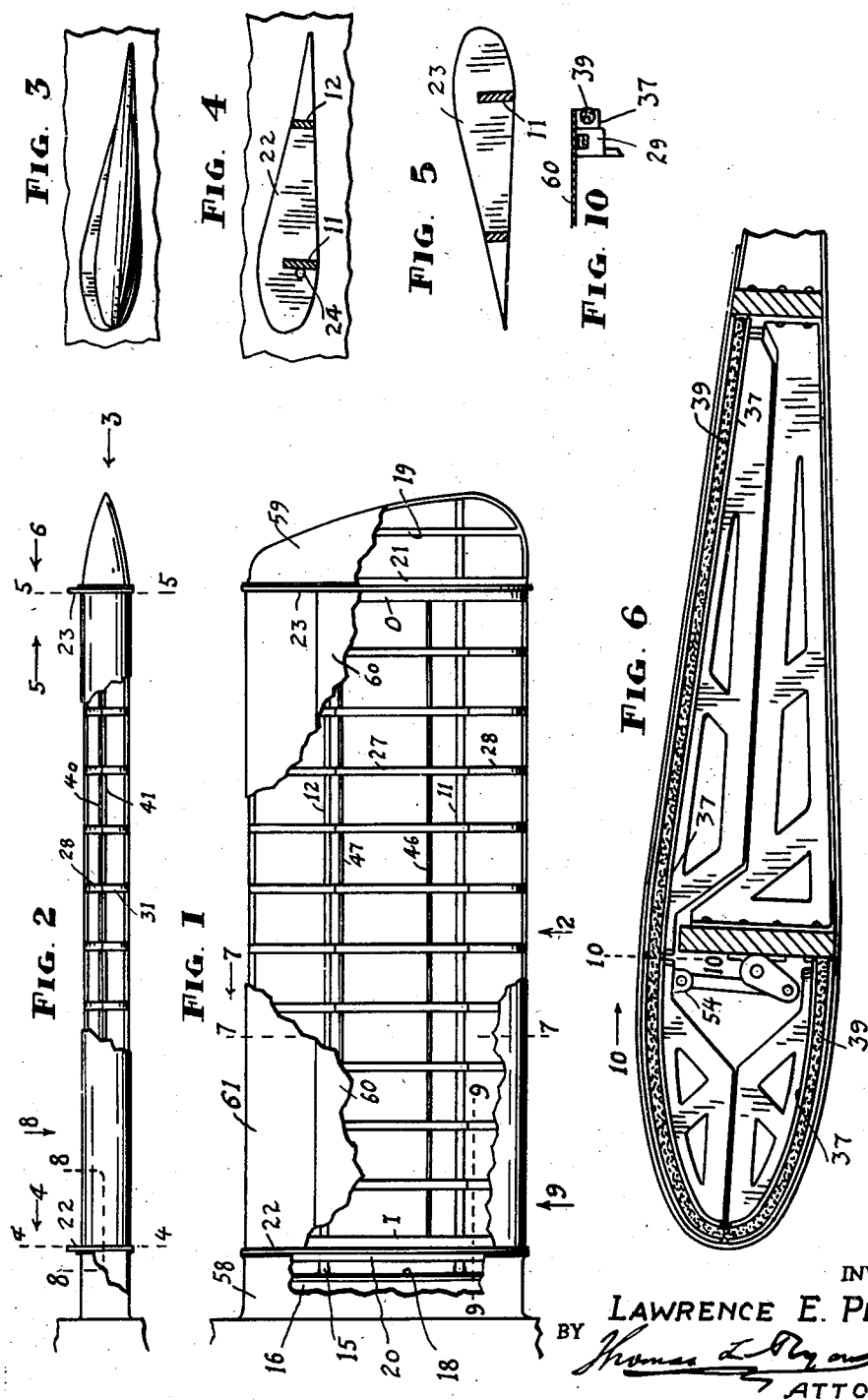
INVENTOR.
LAWRENCE E. PETERS
BY
ATTORNEY March 27, 1945.  L. E. PETERS  2,372,447
AIRPLANE WING
Filed Nov. 15, 1943  2 Sheets-Sheet 2
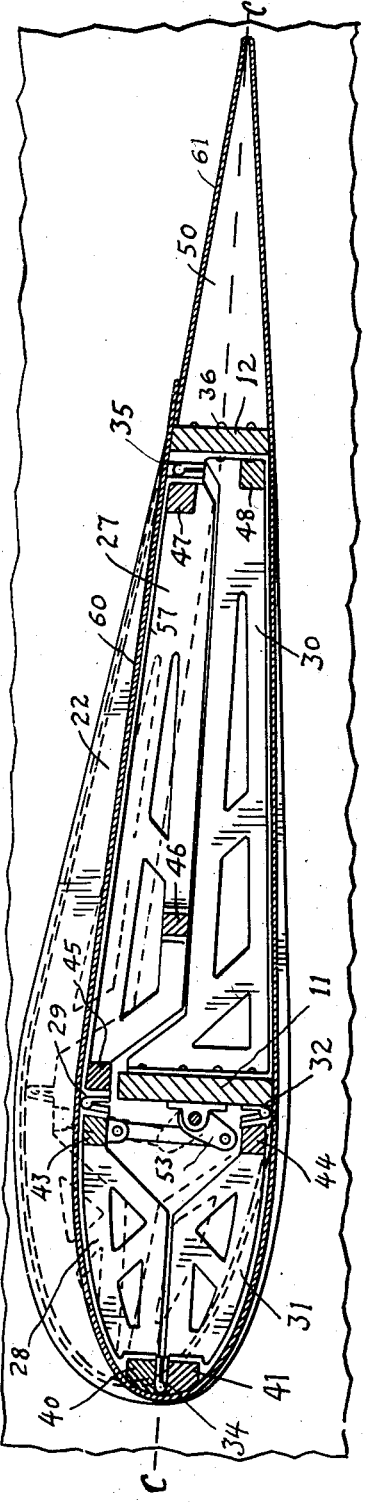
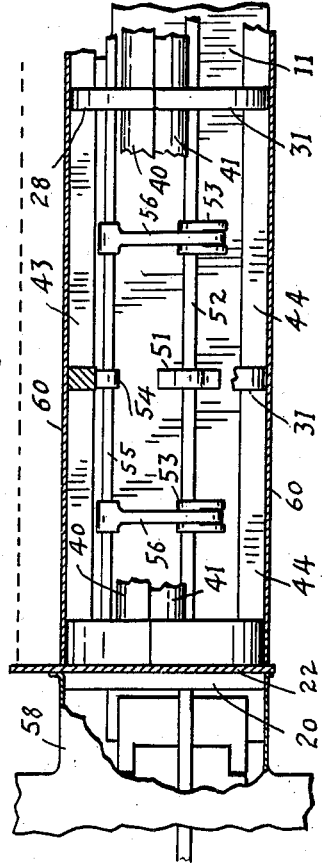
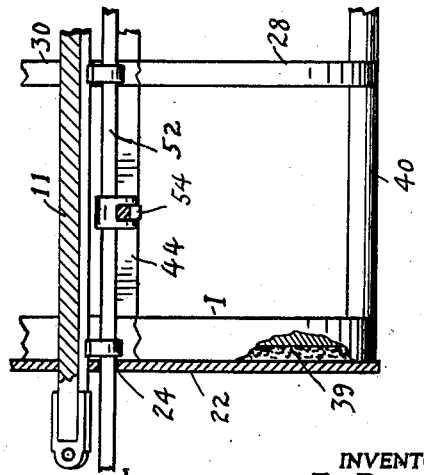
INVENTOR
LAWRENCE E. PETERS
BY
ATTORNEY Patented Mar. 27, 1945

2,372,447

UNITED STATES PATENT OFFICE 2,372,447

AIRPLANE WING

Lawrence E. Peters, Muncie, Ind.

Application November 15, 1943, Serial No. 510,412

3 Claims. (Cl. 244—44)

This invention relates to airplane wing construction, and it is concerned with improvements intended to enable the airplane to operate effectively at all speeds, it being well known that for wide speed range, the ordinary fixed wing is unsuitable.

The angle of attack being high when the airplane is flying at low speed; and being low, when it is flying at high speed; there is accordingly a change in the position of the center of pressure with relation to the wing, and the consequent disturbance of stability of the craft while it is leveling off to the point where the correct lift-drag ratio is had and balance will have been restored.

It is well known that the center of pressure travel with relation to a wing which is constituted of symmetrical sections—that is to say—sections in which the upper and lower surfaces are both convex identically (as distinguished from the usual fixed wing whose upper and lower surfaces are not symmetrical), is very restricted; and that in such a wing, there being no shift of the position of the air reaction as the angle of attack changes, said center of pressure exercises no disturbing effect on the other forces affecting balance.

Whereas the symmetrical wing as hitherto constructed is effective for high speeds and is intended only for aircraft intended for flight at higher speeds and always at a low angle of attack, such a wing is not effective for craft intended for lower speeds; for the reason that at the low speed of flight and the high angle of attack incident thereto, the lift-drag ratio is unsatisfactory.

With due respect to the above defined principles, and mindful of the findings of experience in the use of the symmetrical or double cambered wing, the object of my invention is to provide improvements in construction of, and supply new functions to a wing of the above named character, so that it may be available for maximum low and also for maximum high speeds of airplane operation.

In carrying out my object, I make the airfoil sections, hereinafter called rib structures, of construction and arrangement whereby both the upper and lower cambers are capable of being flexed in such manner that whereas the thickness of the wing may be varied, the contours of the cambers remain substantially unchanged; the areas of the upper and lower surfaces of the wing are unchanged; and the status of the mean camber or median line of the wing is constant. And in combination with such said construction I provide means that is carried by the craft and is controllable by the pilot whereby, when the craft is to be operated at high angle of attack (for low speed), the cambers may be expanded to constitute a thick wing; and when the craft is to be operated at a low angle of attack (for high speed) the cambers may be retracted, to constitute a thin wing.

The wing being symmetrical at high angle of attack, and at low angle of attack, and at all moments during transition from the expanded status to the retracted status (high angle of attack to low angle of attack) and vice versa, there is constantly preserved the important advantage which is characteristic of the symmetrical wing and so essential in the problem of balance, namely the restricted travel of the position of the center of pressure.

The above broadly stated object, as well as other and more specific aims of the invention as same will presently appear, are accomplished by, and my invention is embodied typically in the new construction, combination and arrangement of parts illustrated in the accompanying drawings and described in the following specification.

The several parts of the invention as they appear in the different views in the drawings, are identified by suitable characters of reference applied to them.

In the drawings—

Figure 1 is a diagrammatical top plan view illustrating my improved wing construction, a fragmentary portion of the ship fuselage being shown, and portions of the wing skin being broken away, disclosing to view the rib structures, spars, and other structural parts.

Figure 2 is a front view taken in the direction of arrow 2 in Figure 1.

Figure 3 is an end view, in the direction of arrow 3 in Figure 2.

Figure 4 is a vertical cross section view, taken on the broken line 4—4, in the direction of arrow 4 in Figure 2.

Figure 5 is a vertical cross section view taken on the broken line 5—5, in the direction of arrow 5 in Figure 2.

Figure 6 is an enlarged vertical cross section view taken on the broken line 5—5, in the direction of arrow 6 in Figure 2.

Figure 7 is an enlarged vertical cross section view taken on the broken line 7—7, in the direction of arrow 7 in Figure 1.

Figure 8 is an enlarged sectional top plan view taken on the broken line 8—8, in the direction of arrow 8 in Figure 2.

Figure 9 is an enlarged vertical longitudinal sectional view taken on the line 9—9, in the direction of arrow 9 in Figure 1.

Figure 10 is a cross section view, taken on the broken line 10—10 in the direction of arrow 10, in Figure 6.

Each of the parallel aligned spars 11 and 12, is connected by conventional fastening 15 to the fuselage 16 of the airplane. Root portion 18 and tip portion 19 of the frame structure of the wing, embodies a fixed rib 20 and 21 respectively, double cambered in section and of conventional formation of structure.

Integrated with said root rib and tip rib, is a cheek plate 22 and 23 respectively. These cheek plates (see Figures 1, 4 and 5) made of strong light metal are similar in formation, and each is of contour and dimension so that its upper marginal portion rises a predetermined distance above the plane of the upper surface of the wing, said plane being coincident with the plane of the upper surfaces of said fixed ribs, as indicated in Figures 2, 4 and 7. The said cheek plates, thus in the opposed relation shown, face each other, as indicated in Figures 1 and 2. A hole 24 through plate 22 and its rib 20 will presently be referred to.

Each of the several rib structures that are embodied in the wing consists of a convexly cambered upper member, and a convexly cambered lower member. Each of said members comprises sections flexibly jointed together. In the typical arrangement shown, the upper member consists of a body or rear section 27 and a forward section 28 pivotally jointed together as by a hinge 29. The lower member consists of a body or rear section 30 and a forward section 31 pivotally jointed together as by a hinge 32. The forward sections of said upper and lower members are pivotally jointed together at their leading ends, as by hinge 34. The rear section 27 of said upper member is pivotally jointed, at its rearward end, to the rear section of said lower member, as by hinge 35. The body or rear section 30 of each of said lower members of said rib structure, is fixedly secured to the spars 11 and 12, as by rivets 36.

The said sections 30 are so spaced, that the inboard rib structure I, is disposed directly in sliding engagement with the cheek plate 22 of the root rib; and the outboard rib structure O, is disposed directly in sliding engagement with the cheek plate 23 of the tip rib. Seated in a groove provided therefor in out-turned flange 37 of the marginal portion each, of the rear section 27 and forward section 28 of the upper member, and the forward section 31 of the lower member, of said inboard and outboard rib structures, is a flexible sealing member 39 consisting of a cord of graphite-lubricated packing which constitutes an anti-friction closure against the passing of air at the area of union between the inboard and outboard rib structures I and O at the cheek plates 22 and 23 respectively.

Retaining the leading ends of the forward sections 28 and 31 of the upper and lower members of said rib structures, in spaced relation, are head struts 40 and 41 suitably rounded at their forward faces, and which said head struts constitute the leading edge of the wing structure. Body struts 43 and 44 interconnecting the forward sections, and body struts 45 and 46 interconnecting the body sections of the rib structures each, to the forward sections and rear sections each, of the adjacent rib structures, stay the sections of each rib structure in spaced relation to the corresponding sections of the adjacent rib structure, so that the wing construction in its entirety is of the desired strength and compactness. Similarly, the struts 47 and 48 stay the rear portions of the body sections 27 and 30.

The trailing portion of the wing structure proper, consists of conventional rib members 50 which are secured in suitably spaced order, to the spar 12.

It will be observed that the dimension of the top surface of the wing structure, and the dimension of the bottom surface of the wing structure, measured from the leading edge to the trailing edge are equal.

Secured to a fixed part of the wing structure, namely, the spar 11, and in a position adjacent to each of the rib structures, are pillow blocks 51. A shaft 52 which is journaled in said pillow blocks, extends from the region of the outboard rib structure O, and, through the hole 24 of the fixed rib 20, into the cabin of the plane. The inboard end of said shaft 52 is provided with means (not shown) that are operable, or are actuated, as the case may be, whereby said shaft may be moved oscillatively.

Secured on said shaft 52, in position suitably adjacent to each of said pillow blocks 51, is a bell crank 53. Integrated with the underside of one of the sections of the upper member of each of the rib structures, namely the forward section 28, at its rear end, is a pillow block 54. Carried by said pillow blocks 54 is a shaft 55. Pivotally interconnecting the said shaft 55 and the said bell cranks 53 is a connecting rod 56.

The several sections constituting the upper and lower members of the rib structures just described, may be made of light metal such as aluminum, either of cast or pressed formation, and each embodies a marginal flange 57 which contributes stiffness, and also constitutes a suitable surface to which the skin of the wing is attached.

Skin 58 and skin 59 cover the root rib portion 20—16, and the tip rib portion 21—19, respectively, of the frame structure of the wing. The said skins are lashed at the jointures thereof with the cheek plate 22, and the cheek plate 23 respectively, thereby suitably sealing said jointures.

Skin 60 which extends from the line defined by the rear struts 47 forwardly, rests on the flanges 57, and on struts 45 and 43, and is suitably secured to said flanges and struts, whence it is passed downwardly and in free engagement with the frontal rounded faces of the head struts 40 and 41, and thence rearwardly whence it is secured to the struts 44 and 48, and the flanges of the sections of said lower members of the rib structures.

Skin 61 covers the trailing portion of the wing, its forward marginal portion being lain underneath the rearward marginal portion of the said skin 60.

It will be understood that the details of construction and arrangement of the several parts of my invention are capable of modifications that may be appropriate in applying and adapting the invention to wings of various dimensions, designs and capacities; and that the invention is to be construed as of the breadth and scope as defined in the claims.

I believe myself to be the first to have provided a wing structure wherein the opposed cambers are made flexible in such manner and which are so supported in combination with the spars and with the mover means whereby the wing is operated; that in the operation of the wing, the general contours of the cambers, at all stages of their transition toward or from each other, are practically unchanged. At the same time there is had a change in the inclination of the wing chord (said chord being indicated by the line C—C in Figure 7), and a variation in the thickness of the wing, in which said variation the median line or chord of the wing is constantly equidistant from said cambers. The wing being at all times symmetrical, and the stream lines of the air flow accordingly being normal, the position of the center of pressure with relation to the wing, is the same at high angle of attack, as at low angle of attack. Thus, when the wing is operated (the rear section of its lower member being, as it is, an integral part of the aircraft itself), the thickening or the thinning of the wing is accompanied by the changing of the angle between the wing chord and its direction of motion relative to the air.

By reason of these advantages, the operation of the craft when ascent or descent is desired, is free from any tendency to swerve from the line of flight, nose up or down, or to lose balance and stability.

The pilot being enabled to operate the wing at will, there is rendered unnecessary the relatively long distance of travel of the craft required to obtain initial lift (by initial lift being meant the lift necessary to the take-off); therefore it is practicable to start the craft at low angle of attack (the wing being in the retracted or thin status), and when the speed of travel of the plane will have become sufficient, then to operate the wing to expanded status. Lift power is then immediate. Conversely, when making descent for landing, the distance of slackened speed does not need to be so long as is required with a conventional fixed wing. The craft may descend at relatively high speed to approximately near the landing place, when, upon again operating the wing— this time, to high angle of attack—the craft is readily brought to a stop.

My improved wing construction does not involve structural change or modification of the trailing portion of the wing, the rear spar 12 being available for the use of rib sections thereat of such construction and arrangement as may be desired, and/or to the use of ailerons or other control surfaces characteristic of airplane construction.

What I claim as my invention is:

1. In airplane wing construction, in combination with the airplane spars, rib structures each comprising a flexible cambered upper member and a flexible cambered lower member, the rear portion each, of both members, being pivotally jointed together at their rear ends, and the forward portion each, of both members, being pivotally jointed together at their forward ends, and the rearward portion of the said lower member being fixedly secured to the said spars, mover means carried by the spars, and power transmitting parts interconnecting said mover means and the upper member of said rib structure, said mover means being operable to simultaneously move the forward portion and rear portion of each of said upper members, and the forward portion of each of said lower members to, and to hold them in varied spaced positions, thereby varying the thickness of the wing, and changing the angle between the chord and its direction of motion relative to the air.

2. In airplane wing construction, in combination with the spars, spaced rib structures each comprising a convexly cambered upper member and a convexly cambered lower member, each of said members consisting of sections pivotally jointed together, the rear section of the upper member being pivotally jointed to the rear section of the lower member at the rearward end of the latter, the forward sections of said upper and lower members being pivotally jointed together at their leading ends, and the rear section of each of said lower members being fixedly secured to said spars, body struts interconnecting the several sections of the upper and lower member of each rib structure to the several sections of the upper and lower member of the adjacent rib structure, head struts interconnecting the forward sections each, of the upper member and lower member of each rib structure, to the forward sections each, of the upper and lower members of the adjacent rib structure, a mover device carried by a fixed part of the airplane, power transmitting means interacting between the mover device and an upper member of each of said rib structures, whereby upon operation of the mover device the upper members may be moved to and held in varied retracted and expanded positions with relation to the lower members, the distance between the surfaces of said upper and lower members thereby being varied, and simultaneously therewith, the angle between the wing chord and its direction of motion relative to the air, being varied.

3. In airplane wing construction, in combination with the spars, a fixed root rib and a fixed tip rib, a cheek plate integrated with each of the aforesaid ribs and which said plates extend above the plane of the top surfaces of said ribs and are in opposed facing relation, a series of intermediate rib structures, spaced, and each consisting of a convexly cambered upper member and a convexly cambered lower member, said members each being composed of a body section and a forward section pivotally jointed together, the forward sections each, of said members being pivotally jointed together at their leading ends, the body sections each, of said members being pivotally jointed together at their rearward ends, the body section of each of said lower members being fixedly secured to said spars, and the inboard rib structure and the outboard rib structure of said series being in sliding engagement with the cheek plate of the root rib and the cheek plate of the tip rib, respectively, rounded head struts interconnecting the forward sections of said upper members at their leading ends, rounded head struts interconnecting the forward sections of said lower members at their leading ends, struts interconnecting the forward sections and the body sections of each rib structure to the body sections and forward sections of the adjacent rib structure, thereby staying the several sections of each rib structure in spaced relation to the several sections of the adjacent rib structure, mover means supported fixedly with relation to the body sections of each of said lower members, and power transmitting means interconnecting the mover means and the upper member of each of said rib structures, whereby simultaneously with the operating of the mover means, there is a change of the angle between the wing chord and its direction of motion relative to the air, and a change in the distance between the surfaces of said cambered upper and lower members.

LAWRENCE E. PETERS.